(12) United States Patent
Schlitters

(10) Patent No.: US 6,880,436 B2
(45) Date of Patent: Apr. 19, 2005

(54) SHAVE TOOL HOLDER HAVING A FLOATING BODY INCORPORATING A TAPERED DOVETAIL AND ADJUSTABLE GIB AND INCLUDING INTERCHANGEABLE TOOL POSTS

(76) Inventor: David R. Schlitters, 3724 Eaton Gate La., Auburn Hills, MI (US) 48326

( * ) Notice: Subject to any disclaimer, the term of this patent is extended or adjusted under 35 U.S.C. 154(b) by 30 days.

(21) Appl. No.: 10/369,415

(22) Filed: Feb. 20, 2003

(65) Prior Publication Data

US 2004/0163508 A1 Aug. 26, 2004

(51) Int. Cl.⁷ .............................................. B23B 29/16
(52) U.S. Cl. .............................. 82/110; 82/157; 82/111
(58) Field of Search ...................... 81/110, 111; 470/87, 470/57, 409, 61; 29/98

(56) References Cited

U.S. PATENT DOCUMENTS

| | | | |
|---|---|---|---|
| 1,751,078 A | | 3/1930 | Drowns |
| 2,364,320 A | | 5/1944 | Schlitters ........................ 82/35 |
| 2,451,684 A | * | 10/1948 | Megel et al. .................. 82/158 |
| 3,094,024 A | | 6/1963 | Synk et al. ..................... 82/35 |
| 3,575,073 A | | 4/1971 | Zeller ............................. 82/36 |
| 3,576,145 A | * | 4/1971 | Bernath ........................ 82/157 |
| 3,841,179 A | * | 10/1974 | Brown, II ..................... 82/157 |
| 4,986,151 A | * | 1/1991 | Horn ............................ 82/157 |
| 5,167,136 A | * | 12/1992 | Pietrantoni et al. ........... 72/101 |
| 5,345,846 A | | 9/1994 | Somma .......................... 82/13 |
| 5,737,984 A | | 4/1998 | Francia ......................... 82/157 |
| 5,809,855 A | | 9/1998 | Francia ......................... 82/157 |
| 5,848,562 A | | 12/1998 | Somma ........................ 82/158 |
| 6,012,364 A | | 1/2000 | Peterson et al. .............. 82/157 |
| 6,092,447 A | | 7/2000 | Schlitters ..................... 82/157 |
| 6,105,476 A | | 8/2000 | Peterson et al. ............. 82/1.11 |
| 6,182,542 B1 | | 2/2001 | Peterson et al. ............. 82/1.11 |

* cited by examiner

Primary Examiner—Willmon Fridie, Jr.
(74) Attorney, Agent, or Firm—Gifford, Krass, Groh, Sprinkle, Anderson & Citkowski, P.C.

(57) ABSTRACT

A shave tool holder for use with an automatic screw machine and for machining a rotatably driven workpiece. The tool holder includes a shank engageable with the screw machine and for providing reciprocating motion of the shave tool holder. A dovetail shaped recess is defined within a forward mounting portion of the shank and a corresponding dovetail shaped projection in an opposing surface of the body in order to engage the body with the shank in a vertically deflectable and adjustable manner. A roller is secured in vertically adjustable fashion to a forward facing location of the body. A tool post is releasably secured to the body, through aligning apertures formed in the body and the tool post, a mounting bolt inserting through the aligning apertures for securing the tool post to the body. A cutting insert is secured upon the tool post in a desired spaced relationship relative to the roller and so that the rotatably driven workpiece is adapted to being received between the roller and the insert.

18 Claims, 5 Drawing Sheets

US 6,880,436 B2

SHAVE TOOL HOLDER HAVING A FLOATING BODY INCORPORATING A TAPERED DOVETAIL AND ADJUSTABLE GIB AND INCLUDING INTERCHANGEABLE TOOL POSTS

BACKGROUND OF THE INVENTION

1. Field of the Invention

The present invention relates generally to shave tool holder assemblies. More specifically, the present invention discloses a shave tool holder assembly incorporating a tool body secured in biased and floating fashion relative to a fixed and extending shank portion by a combination of a tapered dovetail slot and screw adjustable gib for both preventing chatter and misalignment. The present invention further discloses a plurality of tool post designs which are interchangeably mounted to the tool body and which include both dovetail and straight insert bit mounting variants.

2. Description of the Prior Art

The prior art is well documented with shave tool holder assemblies. As is known in the art, such shave tool holders are mounted to a suitable reciprocating mechanism, such as which is particularly associated with an automatic screw machine, and, by virtue of the back and forth rocking motion, operates to shave of portions of a rotatably mounted workpiece.

One known example of a shave tool holder is illustrated by example in U.S. Pat. No. 6,092,447, issued to Schlitters, and which discloses a tool holder body, a platform base and a vertically extending superstructure. An elongate shank portion extends from the body and mounts the body to a holder block. The holder block is in turn reciprocally actuated in a horizontal direction in combination with being pivotally actuated in a vertical direction.

A cutter insert is releasably secured upon the platform base and a roller is mounted to a support portion which is in turn secured to the vertically extending superstructure. The roller and support portion are capable of being vertically adjustable up and down along the superstructure by a bolt and such that, upon the roller being upwardly actuated by the rotating workpiece, the cutting tool is brought into contact with the workpiece upon forward reciprocation of the holding block, the holding block being reverse reciprocated to withdraw the body from the machined workpiece.

Examples of a tool holder with a floating roller are illustrated in U.S. Pat. Nos. 6,105,476; 6,012,364 and 6,182,542, all issued to Peterson et al. In each case, the tool holder apparatus includes a heat, a cutting tool mounting fixture attached to the head for holding the cutting tool, and a floating roller assembly pivotally mounted relative to the head. In use, the floating roller assembly can pivot about a pivotal axis relative to the head to allow the floating roller assembly to align with the workpiece. An initial adjustment mechanism is provided, for adjusting the cutting tool relative to the workpiece, and prior to machining of the workpiece.

U.S. Pat. No. 3,841,179, issued to Brown, II, teaches a shave tool holder having a pivotally adjustable member mounted on the forward end of a two part base and providing ways for guidably supporting a floating cutter head. The tool base is held in the assembly and in place on an associated slide by three laterally aligned screws, which permit selective adjustment of the base either longitudinally or laterally of the slide.

Finally, U.S. Pat. Nos. 5,737,984 and 5,809,855, both issued to Francia, teach a shave tool holder device in which a body section of the holder carries at one side a shaving tool bit and a work supporting roller. A quick release pin removably mounts the body to a slide and which is reciprocable in a bore in the slide section. In relevant part, a spring normally urges the inner end of the pin into an opening in the body section to prevent its removal from the slide section, but permits a limited floating movement of the body section relative to the slide section.

SUMMARY OF THE PRESENT INVENTION

The present invention discloses a shave tool holder assembly incorporating a tool body secured in biased and floating fashion relative to a fixed and extending shank portion, by a combination of a tapered dovetail slot and screw adjustable gib, and which provides better control against chatter and misalignment. As previously stated, the present invention further discloses a plurality of tool post designs which are interchangeably mounted to the tool body and which include both dovetail and straight insert bit mounting variants.

The shave tool holder includes a shank, which is engageable with a conventional screw machine and in order to provide reciprocating motion of the shave tool holder. A forward mounting portion of the shank includes a dovetail shaped slot. A main tool body includes a rearward mounting portion upon which is formed a dovetail shaped projection and which is received within the slot in order to mount the body to the shank.

A recess is defined within the forward mounting portion of the shank, in proximity to the dovetail slot and a bottom edge of the mounting portion. An interiorly threaded aperture is defined within the shank-mounting portion and in communication with the recess. A collar portion projects from a forwardly facing surface of the dovetail shaped projection and is received within the slot over a limited axial range of motion upon mounting the body to the shank. A coil spring seats within the recess and abuts against the collar portion. A bolt threadably engages through the collar portion, coil spring and interiorly threaded aperture for mounting the body to the shank and to provide deflection of the tool body relative to the shank.

A roller is secured within a support portion, in turn vertically adjustable within a channel defined within a forward facing location of the body. A tool post is releasably secured to the body through pairs of aligning apertures extending between front and rear faces of the tool post and the body. Mounting bolts insert through the aligning apertures for securing said tool post to said body. Additional engagement of the tool post is provided through the provision of a slot defined within the body in proximity to the apertures, an aligning projection extends from an opposing edge surface of the tool post and is received within the slot upon mounting the tool post.

The removable tool posts are each configured so that they are capable of supporting a differently configured cutting insert. In one variant, the tool post includes an upper surface defined in part by a first dovetail edge extending from a front edge to a rear edge thereof. An engageable portion exhibits a second dovetail edge and is releasably secured along a side edge of the tool post. Aligning apertures extend through the engageable portion and side edge locations of the tool post and receive corresponding mounting bolts for mounting the engageable portion in place. The cutting insert in this variant includes a bottom projecting and dovetail shaped projection seating between the first and second dovetail edges associated with the tool post and the engageable portion.

In a further variant, the tool post further includes a horizontally extending ledge extending between a forwardmost facing surface and a recessed support surface. The insert is releasably secured upon the ledge in abutting fashion against the support surface, again by aligning mounting apertures and fasteners, and so as to define an upper most and forward extending cutting edge. Other and additional types of attachable tool posts, having differently configured cutting inserts, may also be utilized with the shave tool holder and, in combination with the roller, receive the rotatably driven workpiece therebetween upon reciprocating motion of the shave tool holder and in order to machine the workpiece.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
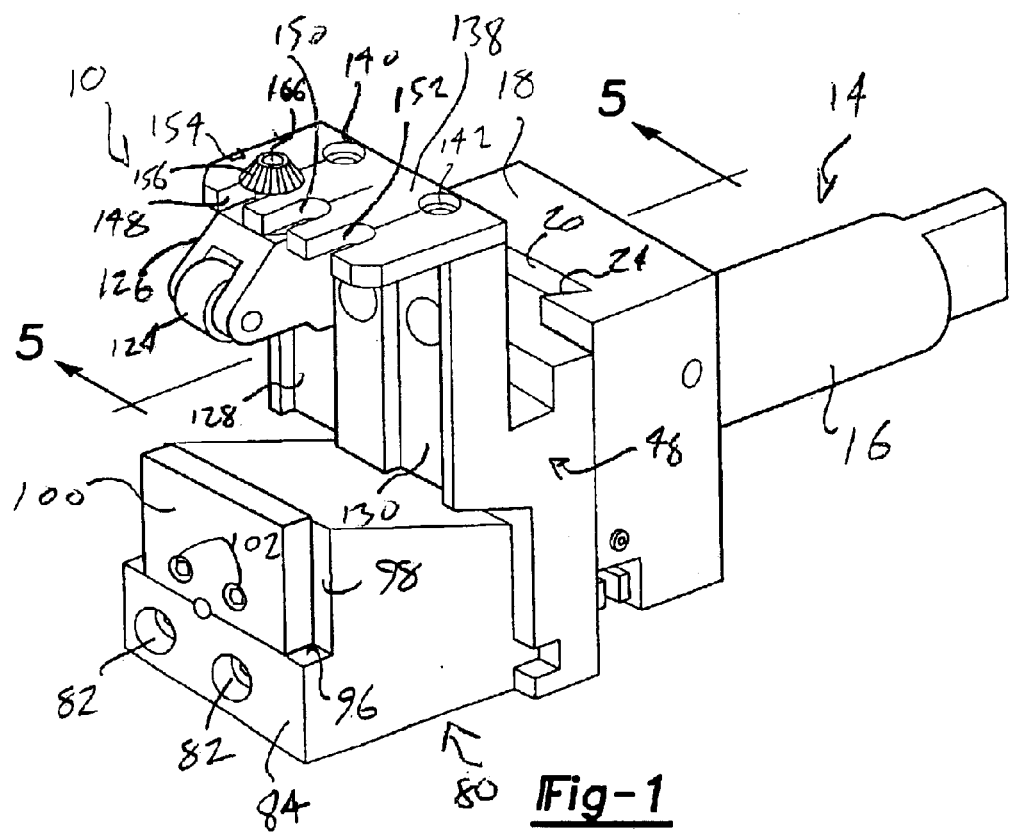
FIG. 1 is an assembled perspective view of the shave tool holder according to a first preferred variant of the present invention.
Figure 2:
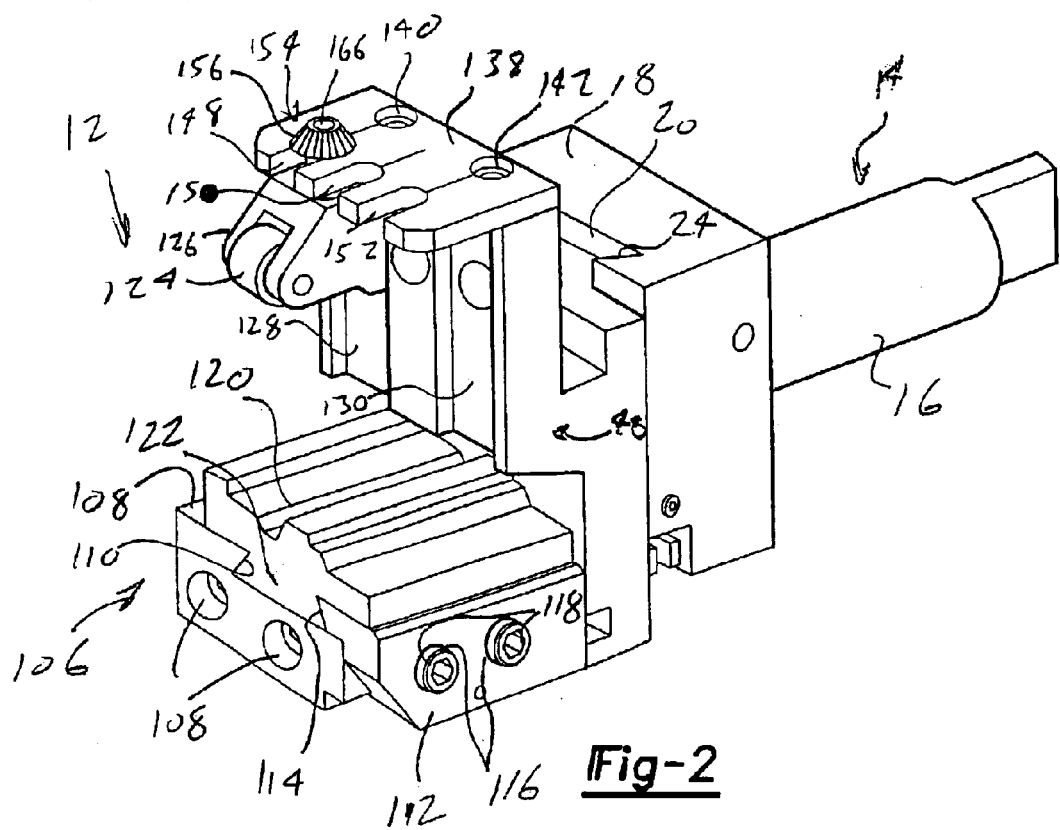
FIG. 2 is an assembled perspective view of the shave tool holder according to a second preferred variant of the present invention.

Referring now to FIG. 1, a shave tool holder assembly is illustrated at 10 according to a first preferred variant of the present invention. As previously described, the shave tool holder according to the present invention provides better control against chatter and misalignment, and by virtue of the floating alignment established between the tool body and associated shank. As will also be described in additional detail with reference to the further variant 12 in FIG. 2, any of a plurality of different tool post designs are capable of being interchangeably mounted to the tool body. As will be further described in detail, these alternate tool post variants include a straight insert bit variant, as shown in FIG. 1, and a dovetail insert bit variant, as illustrated in FIG. 2.

Figure 3:
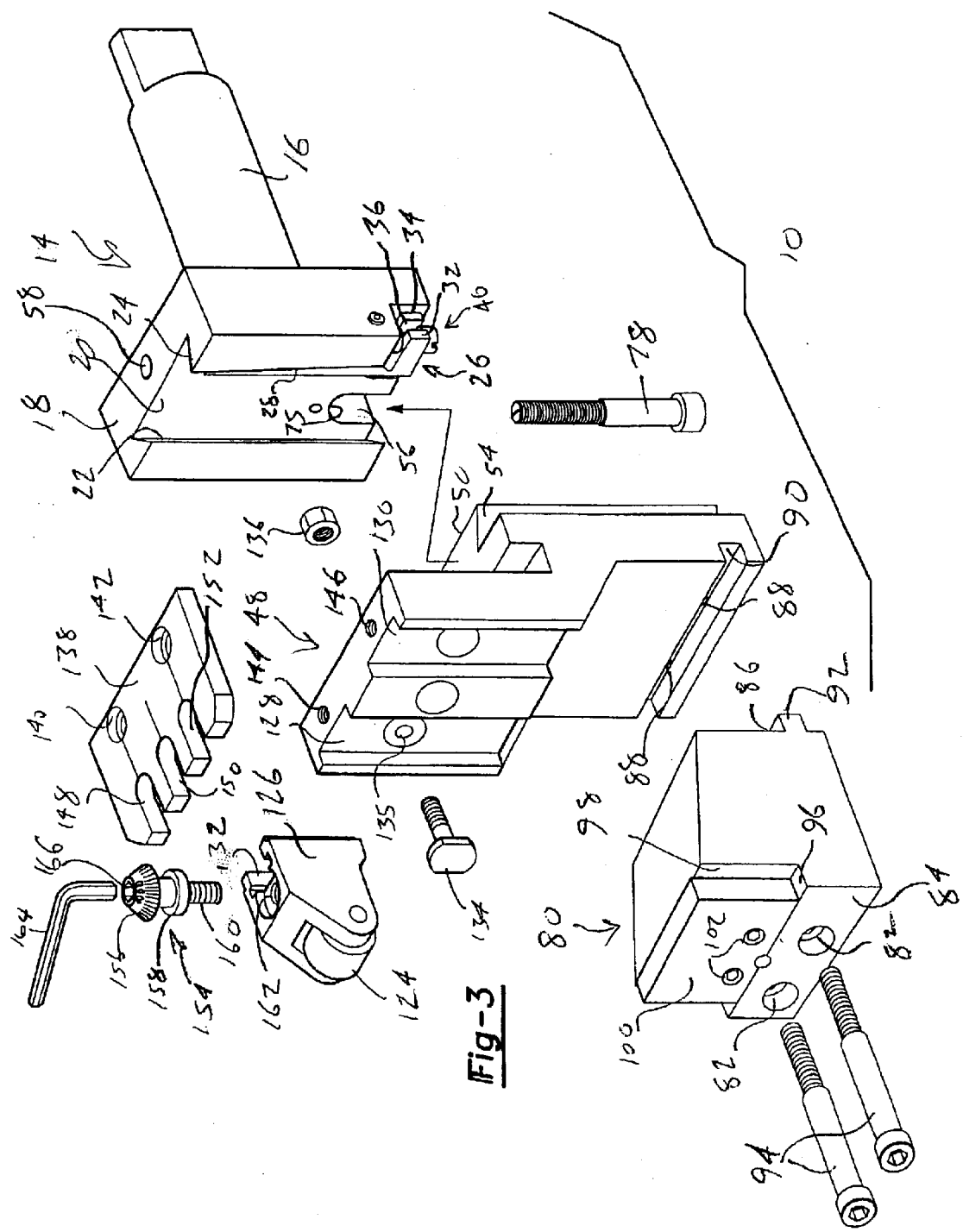
FIG. 3 is an exploded view of the shave tool holder of FIG. 1 and further showing from one perspective the floating and adjustable nature of the tool body relative to the shank.
Figure 6:
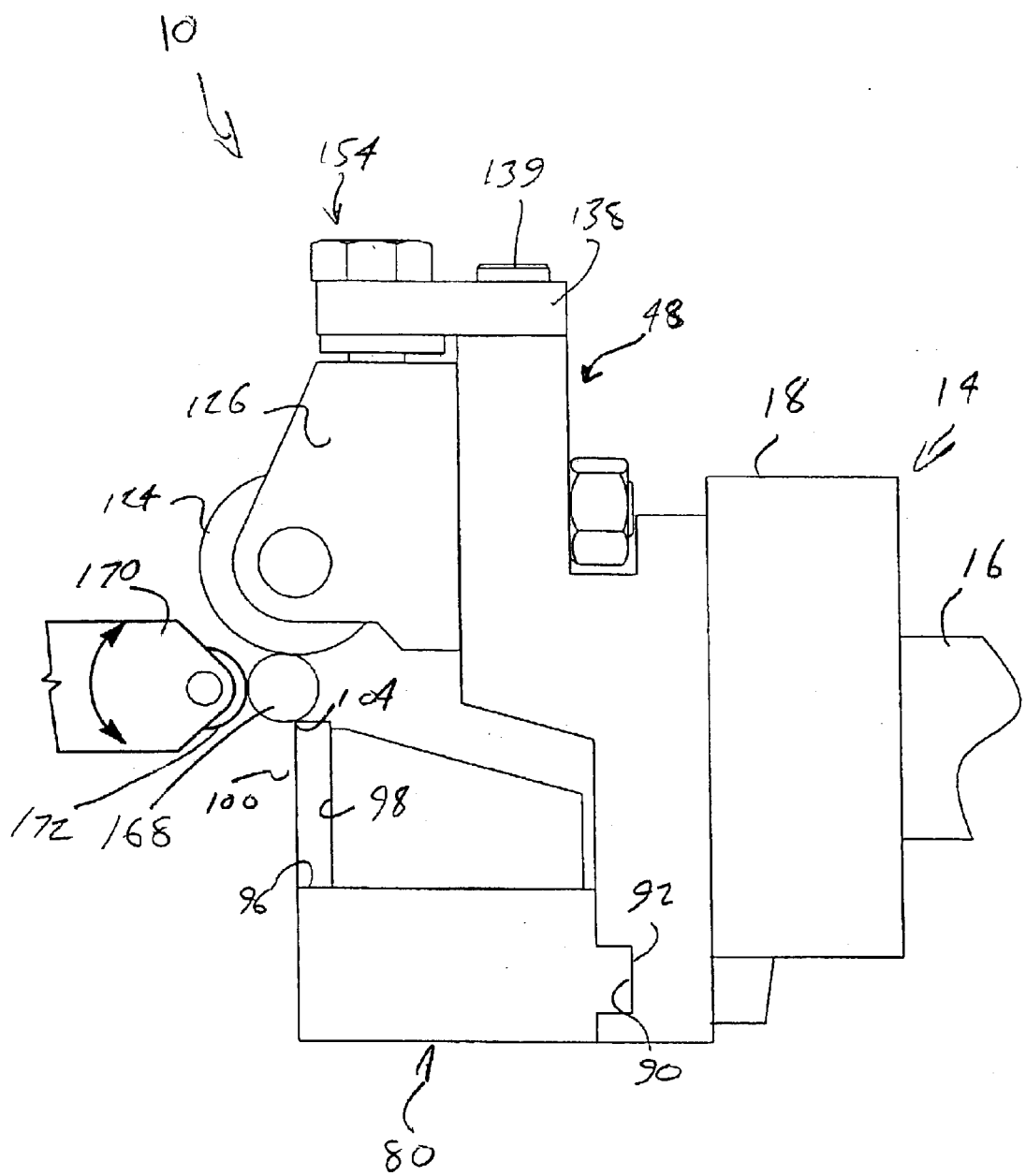
FIG. 6 is an operative illustration in plan view and showing the shave tool holder in operation with a rotatably driven workpiece.

Referring first to the variant of FIG. 1, of which the exploded view of FIG. 3 and the operative view of FIG. 6 is also drawn, a shank is generally referenced at 14 and includes a rearwardly extending portion 16 capable of being engaged by a conventional and automatic screw machine. The screw machine is therefore known in the art and operates to reciprocate the shank 14, as well as the associated components of the shave tool holder, in an eccentric and reciprocating motion.

Figure 4:
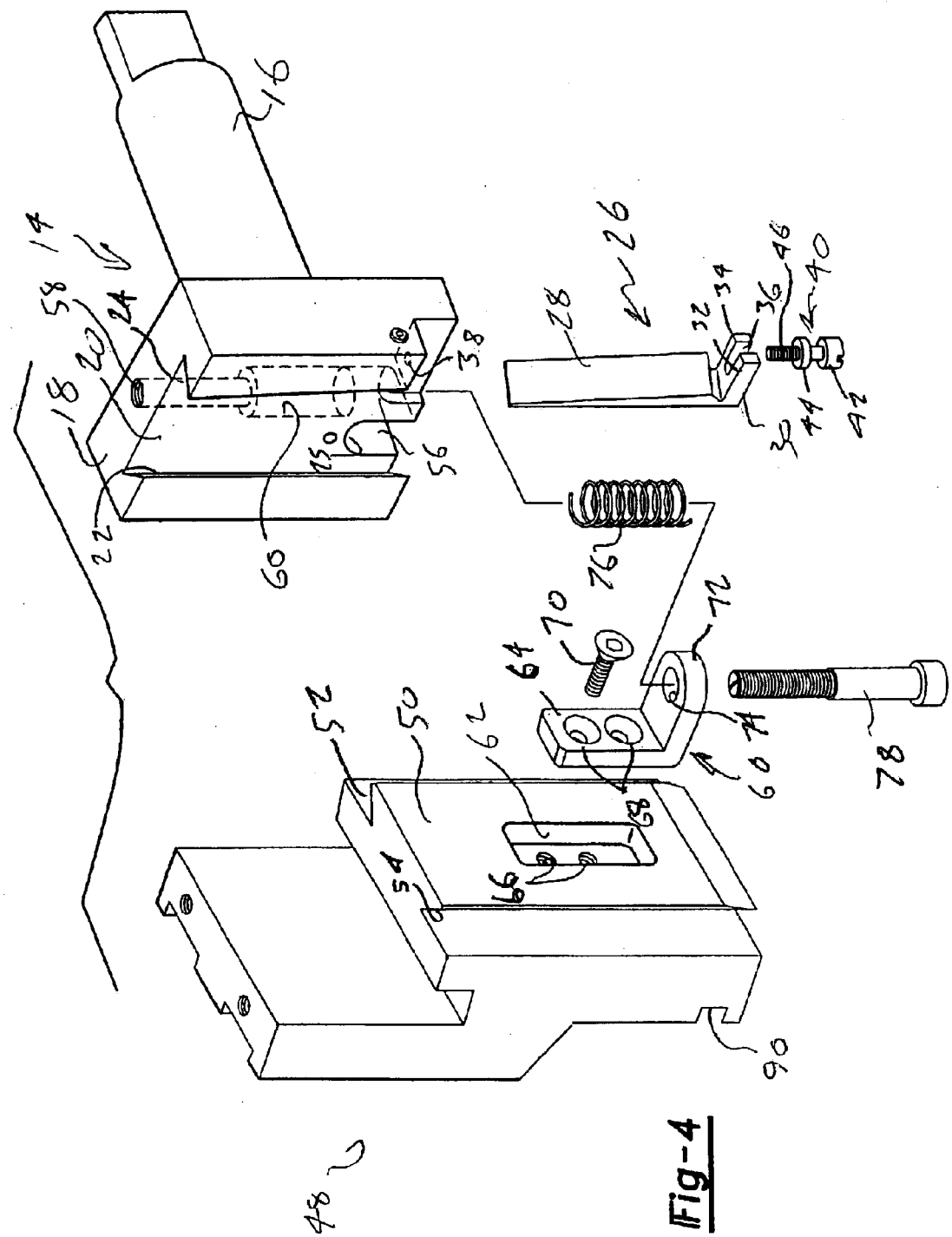
FIG. 4 is a rotated and exploded view of the tool body and shank portions of the shave tool holder in FIG. 3 and showing, from another perspective, the tapered nature of the dovetail slot and the adjustable gib according to the present invention.
Figure 5:
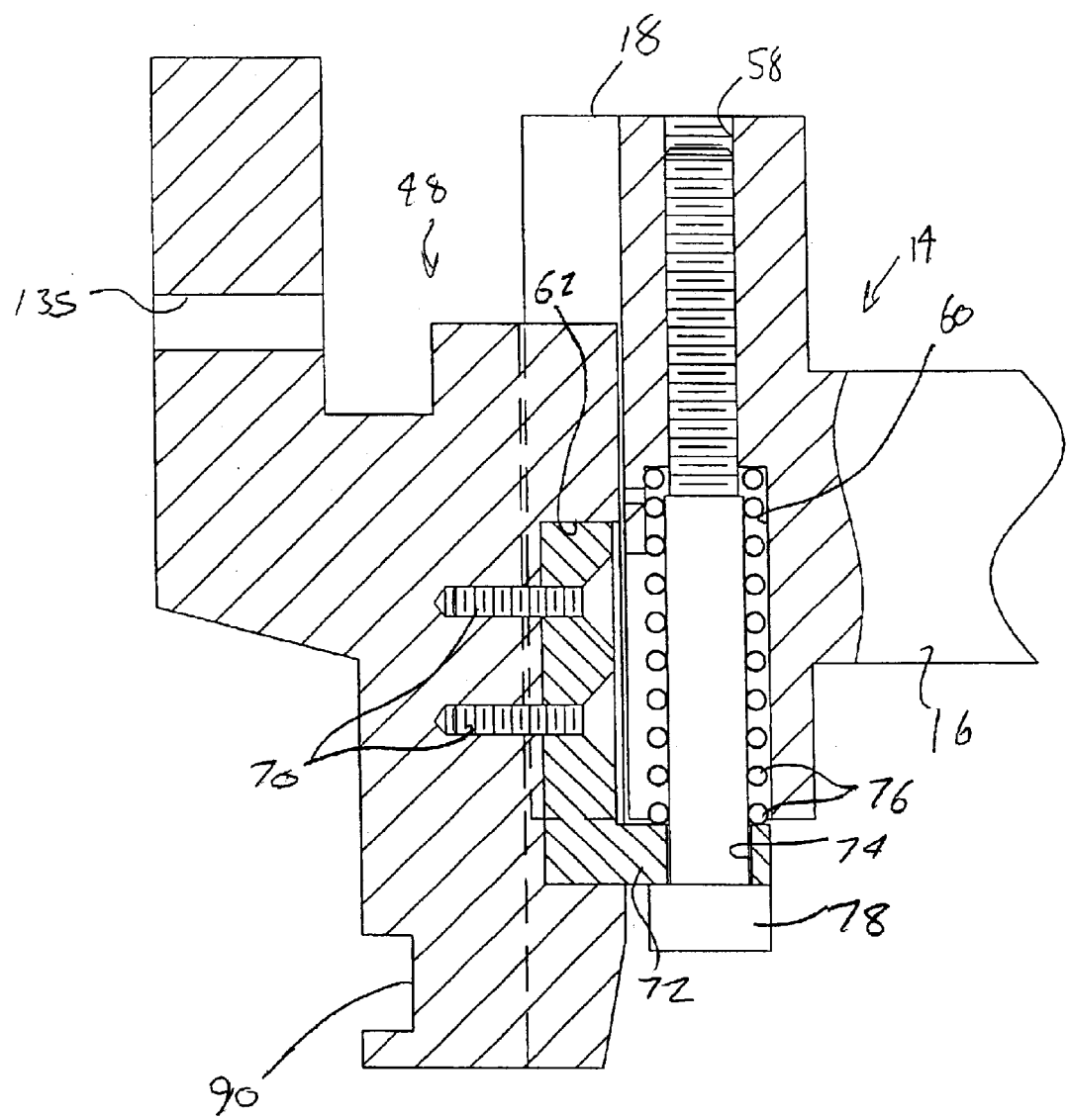
FIG. 5 is a side cutaway view of the tool body and shank portions, taken along line 5—5 in FIG. 1, in assembled fashion and illustrating the floating and spring biasing nature of the assembly.

A mounting portion 18 of the shank 14 extends forwardly from the rearwardly extending portion 16. The mounting portion 18 exhibits a substantially three dimensional and rectangular configuration and exhibits, along a forward facing surface, a dovetail shaped slot extending from top to bottom. As best illustrated in FIGS. 3 and 4, the dovetail slot includes a front face 20 and first 22 and second 24 extending side faces. For purposes that will be further explained, the second extending side face 24 of the dovetail slot is tapered outwardly from a top edge to a bottom edge.

A gib 26 is provided and includes an elongate extending and tapered edge 28 and a head portion 30. As best illustrated in FIG. 4, the head portion 30 further includes a pair of spaced apart and extending fingers 32 and 34, and which define therebetween a recessed slot (see arcuate extending side wall 36). An aperture 38 is defined in a bottom corner location of the mounting portion 18, in proximity to the second tapered and dovetail edge 24 and, upon abutting the tapered edge 28 of the gib 26 against the corresponding tapered dovetail edge 24 of the dovetail slot, a screw 40 is engaged with the head portion 30 upon aligning with the aperture 38 and in order to adjustably secure the gib 26 along a limited axial displacement along the tapered dovetail side face 24.

As further illustrated in FIG. 3, the screw 40 includes a head 42 and a spaced collar portion 44 which are received in abutting fashion against respective top and bottom surfaces of the gib head portion 30. A threaded shaft portion 46, see again FIG. 4, of the screw 40 is threadably engaged within the aperture 38 of the shank mounting portion 18 (see also engaged illustration of FIG. 3) and, upon rotating the screw head 42 in either of first or second directions, causes the tapered edge 28 of the gib 26 to be translated along a limited axial path relative to the tapered dovetail face 24 and in order to adjust the overall width dimension of the dovetail slot.

As will be shortly explained, the ability to adjust the tapered edge 28 of the gib 26, with the provision of only a single mounting screw 40, enables the operator to quickly adjust a degree of floating motion and support of a main body, which is further illustrated generally at 48. The body 48 is constructed of a heavy-duty material, typically a steel or durable metal similar to the composition of the shank.

The body 48 exhibits a mounting portion extending in a rearward direction thereof and in the form of a dovetail shaped projection. As is best illustrated in the rotated exploded view of FIG. 4, the dovetail projection includes an end face 50 and first 52 and second 54 projecting side faces.

As is further best illustrated in FIG. 4, a recess 56 is defined within the forward mounting portion 18 of the shank 14, and in proximity to the dovetail slot surface 20 and a corresponding bottom edge of the mounting portion 18. An interiorly threaded aperture is also defined within the shank mounting portion 18 (see threaded portion 58 and enlarged intermediate portion 60 both in phantom in FIG. 4) and communicates with the recess 56.

A collar portion 60, see again as best shown in FIG. 4, is secured to the forwardly facing and end face surface 50 of the projecting dovetail. In the specific variant illustrated, a recess 62 (again FIG. 4) is defined within the end face surface 50 and within which is received a corresponding leg 64 of the collar portion 60. Aligning pairs of apertures 66 and 68 are defined in both the recess 62 and the collar portion leg 64, respectively, and mounting fasteners (see for example at 70) are engaged therethrough to mount the collar portion. As is also shown in FIG. 4, a further interconnected leg 72 of the collar portion 60 includes an aperture 74 extending therethrough.

Upon slidably engaging the recessed dovetail slot of the shank mounting portion 18, in a downwardly installing direction over the dovetail shaped projection of the main tool body 48, the shank mounting portion travels a specified downward distance, until such time as the projecting leg 72 of the collar portion 60 engages a top edge (see at 75 in FIGS. 3 and 4) of the arcuately defined recess 56. Prior to installation of the shank 14 to the main body 48, a coil spring 76 (see FIG. 4) seats within the recess 56 and in particular within the intermediate communicating portion illustrated in phantom at 60, a bottom end of the coil spring 76 also being supported upon the projecting leg 72 of the collar portion 60 in aligning fashion with the aperture 74.

Upon completed installation of the shank 14 to the main tool body 48, a bolt 78 threadably engages, in an underside inserting fashion, through the aperture 74 in the collar portion 60, the coil spring 76 and in rotatably interengaging fashion with the interiorly threaded aperture portion 58 extending vertically through the main body 48. In this fashion the main tool body 48 is mounted to the shank and, upon rotation of the bolt 78 in a given direction, permits the leg portion 72 of the collar 60 to travel a limited axial and vertical range associated with the vertical distance of the recess 56.

In operation, the floating arrangement of the tool body 48, relative to the shank 14 and its forward mounting portion 18, is provided by a combination of the amount of vertical and biasing displacement permitted between the collar 60 and the top edge 75 of the recess 56, as well as the adjustable displacement of the tapered surface 28 of the gib 26 along the vertically extending and outwardly tapered surface 24 of the dovetail slot. Through manipulation of the gib 26, the shave tool assembly can be calibrated to greatly reduce the instances of chatter and misalignment during operation and by providing the desired degree of floating and biasing travel of the main body 48 relative to the shank 14. As is also clearly evident from the drawings, removal of the main tool body 48 is quickly accomplished simply by unthreading the mounting bolt 78 and allowing the main body 48, and its associated collar 60, to drop downwardly and outwardly from the recess 56 of the shank mounting portion 18.

Having provided a fairly detailed description of the floating arrangement of shave tool holder, reference is again made to FIGS. 1 and 3 and which illustrates a tool post arrangement, generally referenced at 80, according to a first preferred operating variant. As has been previously described, the shave tool holder of the present invention is capable of operating with differently configured tool post and cutting insert designs, two of which will be illustrated and described in the present disclosure.

Referring once again to FIGS. 1 and 3, the tool post 80 is constructed as a three dimensional body having at least one, and preferably a pair, of apertures 82 extending between a front face 84 and a rear face 86 of the tool post 80. Corresponding and interiorly threaded apertures 88, see FIG. 3, are formed in the main tool body 48 and, upon aligning the tool post 80, align with the apertures 82 in the tool post. A slot 90 is further defined within the body 48, in proximity to the apertures 88, and an aligning projection 92 extends from an opposing edge surface (proximate rear face 86) of the tool post 80 and is received within the slot 90 upon mounting the tool post 80 thereupon and through the provision of mounting bolts 94 (see again FIG. 3) inserting through the aligning pairs of apertures, 82 and 88.

The tool post 80 further includes a horizontally extending ledge 96 extending between a forward-most facing surface (see again at 84) and a recessed support surface 98. An insert 100 is releasably secured upon the ledge 96, in abutting fashion against the support surface 98, and through apertures 102 aligning with additional apertures (not shown in FIGS. 1, 3 and 6) located within the support surface 98 of the tool post 80 and so that the insert 100 defines an upper most and forward extending cutting edge 104.

Referring to the alternate variant of FIG. 2, a tool post is generally referenced at 106 and, as with the tool post illustrated in the first variant at 80, includes a three dimensional body with apertures 108 that extend the width of the tool post 106 and align with the identical apertures 88 of the main body 48. The identical slot 90 and projection 92 arrangement is again repeated for this variant and to facilitate secure holding of the tool post 106 when mounted to the main body 48.

The tool post 106 further includes an upper surface 108 (see again FIG. 2) defined in part by a first dovetail edge 110 extending from a front edge to a rear edge of the tool post 106. A three dimensional engageable portion 112 is provided and exhibits a second dovetail edge 114. At least one, and preferably a pair, of aligning apertures 116 are provided along the side of the engageable portion 112 and align with similar apertures (not shown) defined within the side facing edge of the tool post 106 so that, upon receiving mounting bolts 118, the engageable portion 112 is releasably secured along a side edge of the tool post 106.

The cutting insert in this variant is illustrated at 120 and exhibits a bottom projecting dovetail shape 122 which, upon being positioned in abutting fashion with the first dovetail edge 110 of the tool post 106 and prior to the installation of the engageable portion 112, seats between the first and second dovetail edges associated with the tool post and the engageable portion. The top surface of the cutting insert 120 is therefore a dovetail insert, as opposed to the straight cutting edge insert 100 in the first variant.

In any variant, a roller 124 is provided and is mounted to a support portion 126 in turn vertically adjustable relative to a forward mounting location, see for example at 128 and 130, of the main tool body 148. In particular, and as is best illustrated again in the exploded view of FIG. 3, the roller 124 and associated support 126 is secured to the vertically extending superstructure of the main tool body 148 by virtue of a channel guide 132 of the roller support 126 seating within an associated and vertically extending guide (see again at 128 and 130) of the main tool body 148. A bolt 134 and attachable nut 136 engage with a selected one of the guides 128 and 130 (through aperture 135) and provide a seating location of the channel guide 132 of the roller assembly.

In order to facilitate vertical adjustment of the roller 124 and support portion 126, a ledge plate 138 is secured atop the main body 48 by means of bolts (not shown in FIG. 3 but evident at 139 in the side view illustration of FIG. 6) which engage aligning apertures 140 and 142 in the ledge plate 138 and threaded apertures 144 and 146 extending vertically within the tool body superstructure 48 and proximate the extending guides 128 and 130. Seating guides 148, 150 and 152 are defined along a forward extending edge of the ledge plate 138 and are capable of being received by a threaded tightening bolt 154, see again as best shown in FIG. 3, the bolt 154 including a main head portion 156, a spaced and fixed collar portion 158 and an extending and exteriorly threaded shaft portion 160.

The main head portion 156 and fixed collar portion 158 of the bolt 154 are positioned in seating fashion within a selected seating guide 148, 150 and 152 and so that they abut against opposite top and bottom sides of the ledge plate 138. Concurrently, the threaded shaft portion 160 is rotatably interengaged with an interiorly threaded aperture 162 extending vertically within the roller support portion (referencing again FIG. 3). A tool, such as a suitably sized Allen wrench 164, is engaged within an open top 166 of the main head portion 156 vertically adjust up and down along the roller 124 and associated support 126 by virtue of the rotation of the bolt 154. Again referencing FIG. 6, upon the roller 124 being contacted by the rotating workpiece, see at 168, the cutting tool (in this case the insert 100 with straight cutting edge 104) is brought into contact with the workpiece 168 concurrent with a roller support assembly 170, the same including an associated roller 172 and which operates to maintain the position of the rotating workpiece 168 during operation of the shave tool.

It is evident therefore that the present invention teaches an improved shave tool holder for use with an automatic screw machine. Having described my invention, additional preferred embodiments will become apparent to those skilled in the art to which it pertains and without deviating from the scope of the appended claims. For example, other and additional types of tool posts with associated insert cutting bits can be substituted for those disclosed and illustrated in the present disclosure and within the scope of the present invention.

I claim:

1. A shave tool holder for use with an automatic screw machine and for machining a rotatably driven workpiece, said tool holder comprising:
    a shank engageable with the screw machine and for providing reciprocating motion of the shave tool holder, said shank further comprising a forward mounting portion within which is formed a dovetail shaped slot;
    a body engageable with said shank in a vertically deflectable and adjustable manner, said body further comprising a rearward mounting portion upon which is formed a dovetail shaped projection received within said slot to mount said body to said shank;
    a roller secured in vertically adjustable fashion to a forward facing location of said body; and
    a tool post releasably secured to said body, a cutting insert being secured upon said tool post in a desired spaced relationship relative to said roller and so that the rotatably driven workpiece is adapted to being received between said roller and said insert.

2. The shave tool holder as described in claim 1, further comprising a gib having an elongated and tapered edge secured in abutting and adjustable fashion against a selected side facing surface of said dovetail shaped slot.

3. The shave tool holder as described in claim 2, said selected side facing surface of said dovetail slot further comprising an outward taper from a top edge to a bottom edge thereof.

4. The shave tool holder as described in claim 3, said gib further comprising a head portion through which is received an adjustment screw, said screw engaging an aperture defined within a bottom edge of said shank mounting portion and being rotatable to axially adjust said elongated and tapered gib edge along said side facing dovetail slot surface.

5. The shave tool holder as described in claim 1, further comprising a recess defined within said forward mounting portion of said shank, in proximity to said dovetail slot and a bottom edge of said mounting portion, an interiorly threaded aperture being defined within said shank mounting portion and communicating with said recess, a collar portion projecting from a forwardly facing surface of said dovetail shaped projection and which is received within said slot over a limited axial range upon mounting said body to said shank.

6. The shave tool holder as described in claim 5, further comprising a coil spring seating within said recess and abutting against said collar portion, a bolt threadably engaging through said collar portion, coil spring and interiorly threaded aperture for mounting said body to said shank.

7. The shave tool holder as described in claim 1, said tool post further comprising at least one aperture extending between a front face and a rear face thereof, at least one interiorly threaded aperture being formed in said body and aligning with said aperture in said tool post, a mounting bolt inserting through said aligning apertures for securing said tool post to said body.

8. The shave tool holder as described in claim 7, further comprising a slot defined within said body in proximity to said apertures, an aligning projection extending from an opposing edge surface of said tool post and being received within said slot upon mounting said tool post.

9. The shave tool holder as described in claim 7, said tool post further comprising an upper surface defined in part by a first dovetail edge extending from a front edge to a rear edge thereof, an engageable portion exhibiting a second dovetail edge and being releasably secured along a side edge of said tool post.

10. The shave tool holder as described in claim 9, further comprising at least one aligning aperture extending through said engageable portion and said tool post, at least one corresponding mounting bolt engaging through said aligning apertures.

11. The shave tool holder as described in claim 9, said cutting insert further comprising a bottom projecting and dovetail shaped projection seating between said first and second dovetail edges associated with said tool post and said engageable portion.

12. The shave tool holder as described in claim 7, said tool post further comprising a horizontally extending ledge extending between a forward-most facing surface and a recessed support surface, said insert being releasably secured upon said ledge in abutting fashion against said support surface, through at least one aligning aperture defined in both said insert and said recessed support surface, and so that said insert defines an upper most and forward extending cutting edge.

13. The shave tool holder as described in claim 1, further comprising said roller being secured within a support portion which is in turn vertically adjustable within a channel defined within said body.

14. The shave tool holder as described in claim 13, further comprising a ledge plate secured atop said body, a bolt fastener including first and second spaced apart head portions which abut against opposite top and bottom edges of said plate upon inserting said fastener within a curved side wall of said ledge plate and corresponding to at least one slotted guide, an extending and threaded shaft portion of said bolt threadably engaging within a vertical extending and interiorly threaded side wall associated with said roller support portion.

15. A shave tool holder for use with an automatic screw machine and for machining a rotatably driven workpiece, said tool holder comprising:

a shank engageable with the screw machine and for providing reciprocating motion of the shave tool holder, said shank further comprising a forward mounting portion within which is formed a dovetail shaped slot;

a body having a rearward mounting portion upon which is formed a dovetail shaped projection received within said slot;

a recess defined within said forward mounting portion of said shank, in proximity to said dovetail slot and a bottom edge of said mounting portion, an interiorly threaded aperture being defined within said shank mounting portion and communicating with said recess, a collar portion projecting from a forwardly facing surface of said dovetail shaped projection and which is received within said slot over a limited axial range upon mounting said body to said shank;

a coil spring seating within said recess and abutting against said collar portion, a bolt threadably engaging through said collar portion, coil spring and interiorly threaded aperture for mounting said body to said shank in a vertically deflectable and adjustable manner;

a roller secured in vertically adjustable fashion to a forward facing location of said body; and a tool post releasably secured to said body, a cutting insert being secured upon said tool post in a desired spaced relationship relative to said roller and so that the rotatably driven workpiece is adapted to being received between said roller and said insert.

16. A shave tool holder for use with an automatic screw machine and for machining a rotatably driven workpiece, said tool holder comprising:

a shank engageable with the screw machine and for providing reciprocating motion of the shave tool holder;

a body engageable with said shank in a vertically deflectable and adjustable manner;

a roller secured in vertically adjustable fashion to a forward facing location of said body;

a tool post comprising at least one aperture extending between a front face and a rear face thereof, at least one interiorly threaded aperture being formed in said body and aligning with said aperture in said tool post, a mounting bolt inserting through said aligning apertures for securing said tool post to said body; and a cutting insert being secured upon said tool post in a desired spaced relationship relative to said roller and so that the rotatably driven workpiece is adapted to being received between said roller and said insert.

17. A shave tool holder for use with an automatic screw machine and for machining a rotatably driven workpiece, said tool holder comprising:

a shank engageable with the screw machine and for providing reciprocating motion of the shave tool holder;

a body engageable with said shank in a vertically deflectable and adjustable manner;

a roller secured in vertically adjustable fashion to a forward facing location of said body; and a tool post releasably secured to said body, a cutting insert being secured upon said tool post in a desired spaced relationship relative to said roller and so that the rotatably driven workpiece is adapted to being received between said roller and said insert, said tool post further comprising at least one aperture extending between a front face and a rear face thereof, at least one interiorly threaded aperture being formed in said body and aligning with said aperture in said tool post, a mounting bolt inserting through said aligning apertures for securing said tool post to said body.

18. A shave tool holder for use with an automatic screw machine and for machining a rotatably driven workpiece, said tool holder comprising:

a shank engageable with the screw machine and for providing reciprocating motion of the shave tool holder;

a body engageable with said shank in a vertically deflectable and adjustable manner;

a roller secured in vertically adjustable fashion to a forward facing location of said body, said roller being secured within a support portion which is in turn vertically adjustable within a channel defined within said body; and a tool post releasably secured to said body, a cutting insert being secured upon said tool post in a desired spaced relationship relative to said roller and so that the rotatably driven workpiece is adapted to being received between said roller and said insert.

* * * * *